(12) United States Patent
Kumar et al.

(10) Patent No.: US 8,687,964 B2
(45) Date of Patent: Apr. 1, 2014

(54) IN-BAND CONTROL MECHANISM

(75) Inventors: Santosh S. Kumar, San Jose, CA (US);
Christopher Michael Look, Pleasanton, CA (US)

(73) Assignee: Dynamic Method Enterprise Limited, Hong Kong (HK)

( * ) Notice: Subject to any disclaimer, the term of this patent is extended or adjusted under 35 U.S.C. 154(b) by 146 days.

(21) Appl. No.: 13/324,927

(22) Filed: Dec. 13, 2011

(65) Prior Publication Data

US 2012/0148236 A1 Jun. 14, 2012

Related U.S. Application Data

(60) Provisional application No. 61/422,616, filed on Dec. 13, 2010.

(51) Int. Cl.
*H04J 14/00* (2006.01)
*H04J 14/02* (2006.01)

(52) U.S. Cl.
CPC .................................. *H04J 14/0282* (2013.01)
USPC ............................................... 398/72; 398/58

(58) Field of Classification Search
USPC .................. 398/25, 58, 67, 68, 70–72, 66
See application file for complete search history.

(56) References Cited

U.S. PATENT DOCUMENTS

| | | | |
|---|---|---|---|
| 2009/0034964 A1* | 2/2009 | Sakai et al. ........................ | 398/17 |
| 2011/0158642 A1* | 6/2011 | Barnard et al. .................. | 398/25 |
| 2011/0236018 A1* | 9/2011 | Valiveti et al. .................. | 398/45 |
| 2012/0093512 A1* | 4/2012 | Lee et al. ........................ | 398/66 |
| 2012/0121252 A1* | 5/2012 | Kim et al. ........................ | 398/16 |
| 2013/0136445 A1* | 5/2013 | El-Ahmadi et al. ............ | 398/22 |

* cited by examiner

*Primary Examiner* — Dalzid Singh
(74) *Attorney, Agent, or Firm* — Blakely, Sokoloff, Taylor & Zafman LLP

(57) ABSTRACT

A method and apparatus of managing remote third party OTN & WDM transceiver equipment using the same fibers used for end user data exchange is described. A network device collects management instructions for the OTN & WDM transceiver equipment, assembles this management information into the overhead of a data frame and transmits on an optical link directly coupled to the network device. The WDM transceiver function converts the optical signal to an electrical one and the OTN function extracts the management instructions from the OTN overhead. A processor associated with the OTN framer function acts on that information. The management instructions includes the instruction to periodically and continuously, load certain performance, alarm or informational data into its OTN overhead and transmit that to a similar transceiver at the remote end of the communications link. Network-based monitoring equipment can optically tap off a portion of the signal and extract this information, allowing the network-based device to gain knowledge of conditions at the end points.

17 Claims, 11 Drawing Sheets

OTN AND WDM TRANSCEIVER FUNCTION BLOCKS

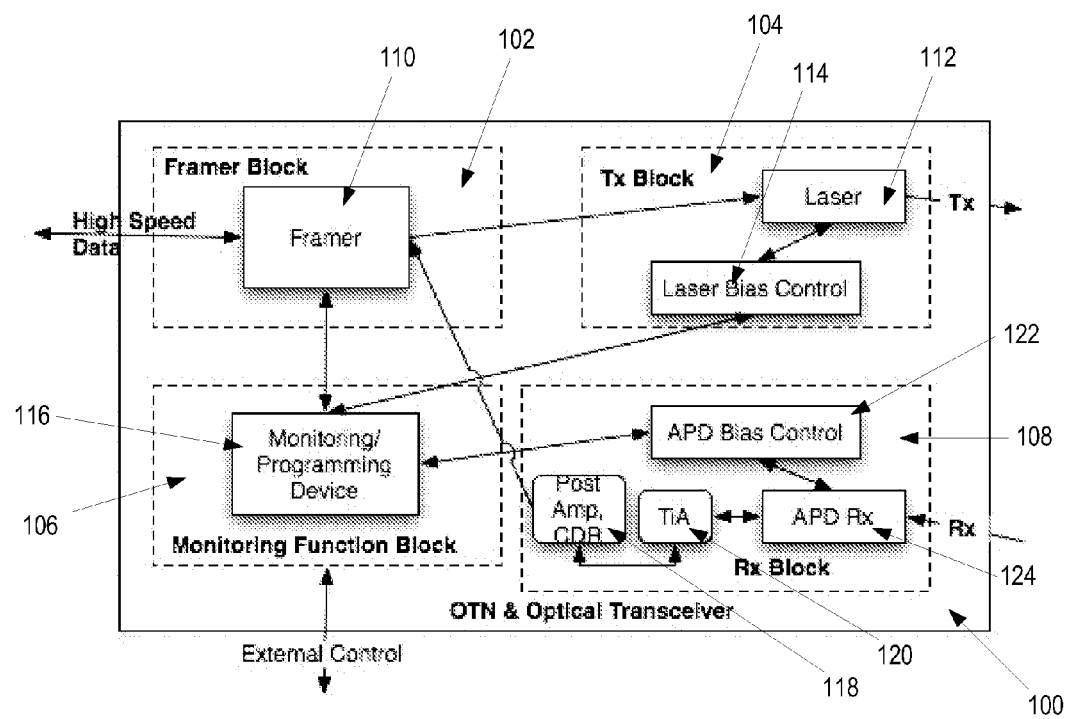
FIGURE 1. OTN AND WDM TRANSCEIVER FUNCTION BLOCKS

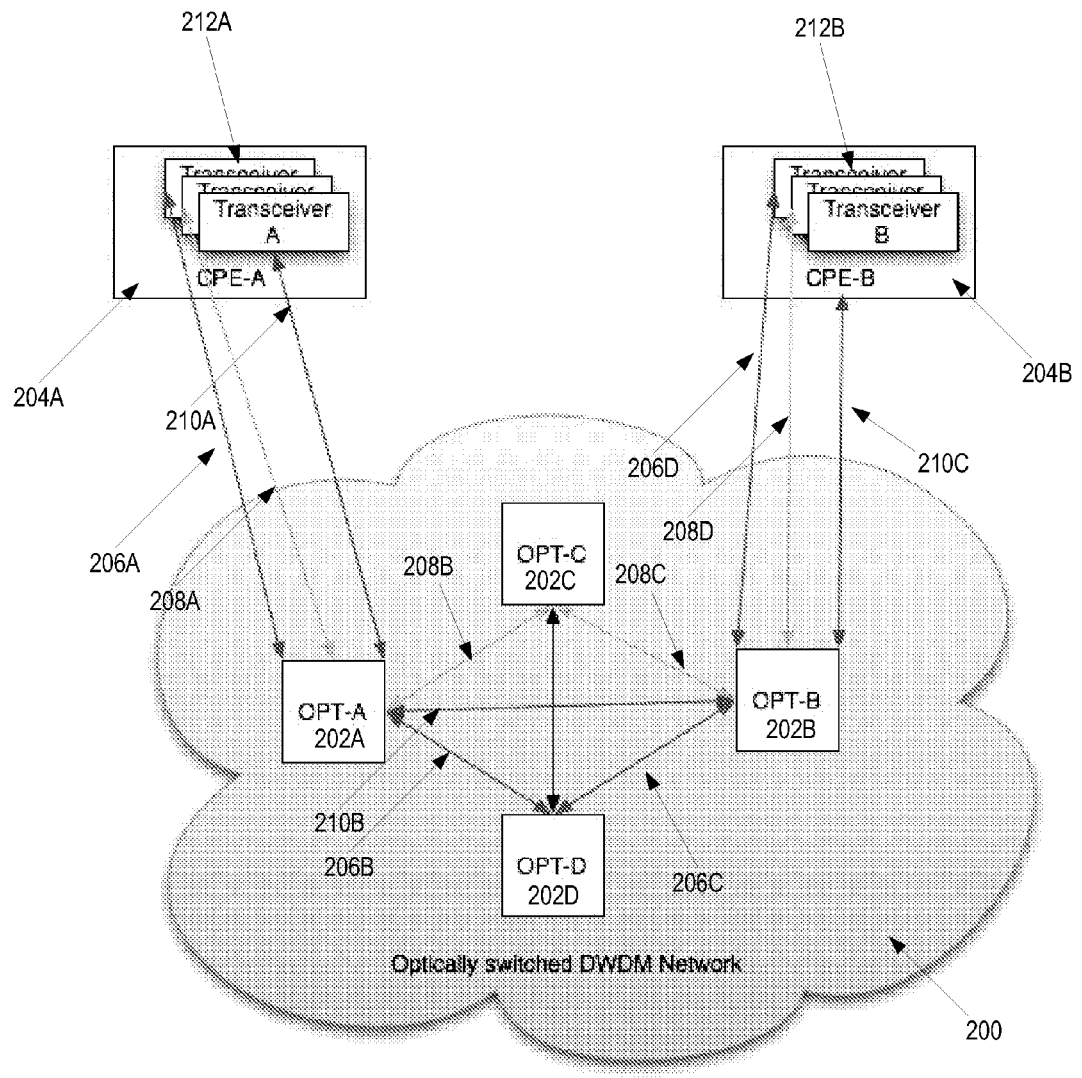
Figure 2: Light Path

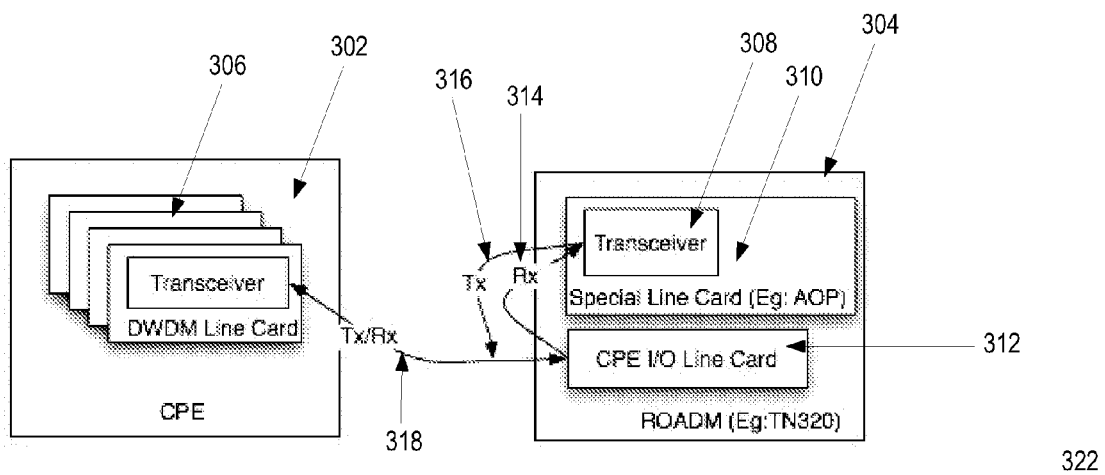
Figure 3a: In-band Management - DWDM Configuration Mode
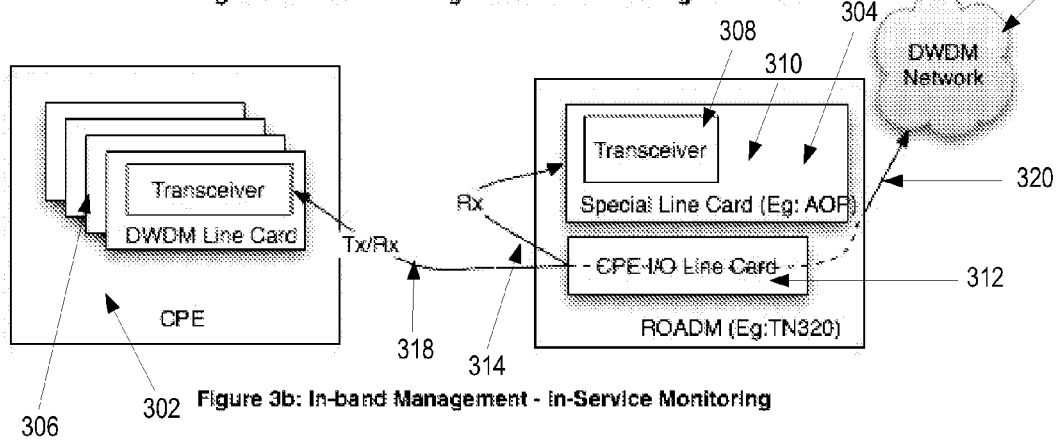
Figure 3b: In-band Management - In-Service Monitoring

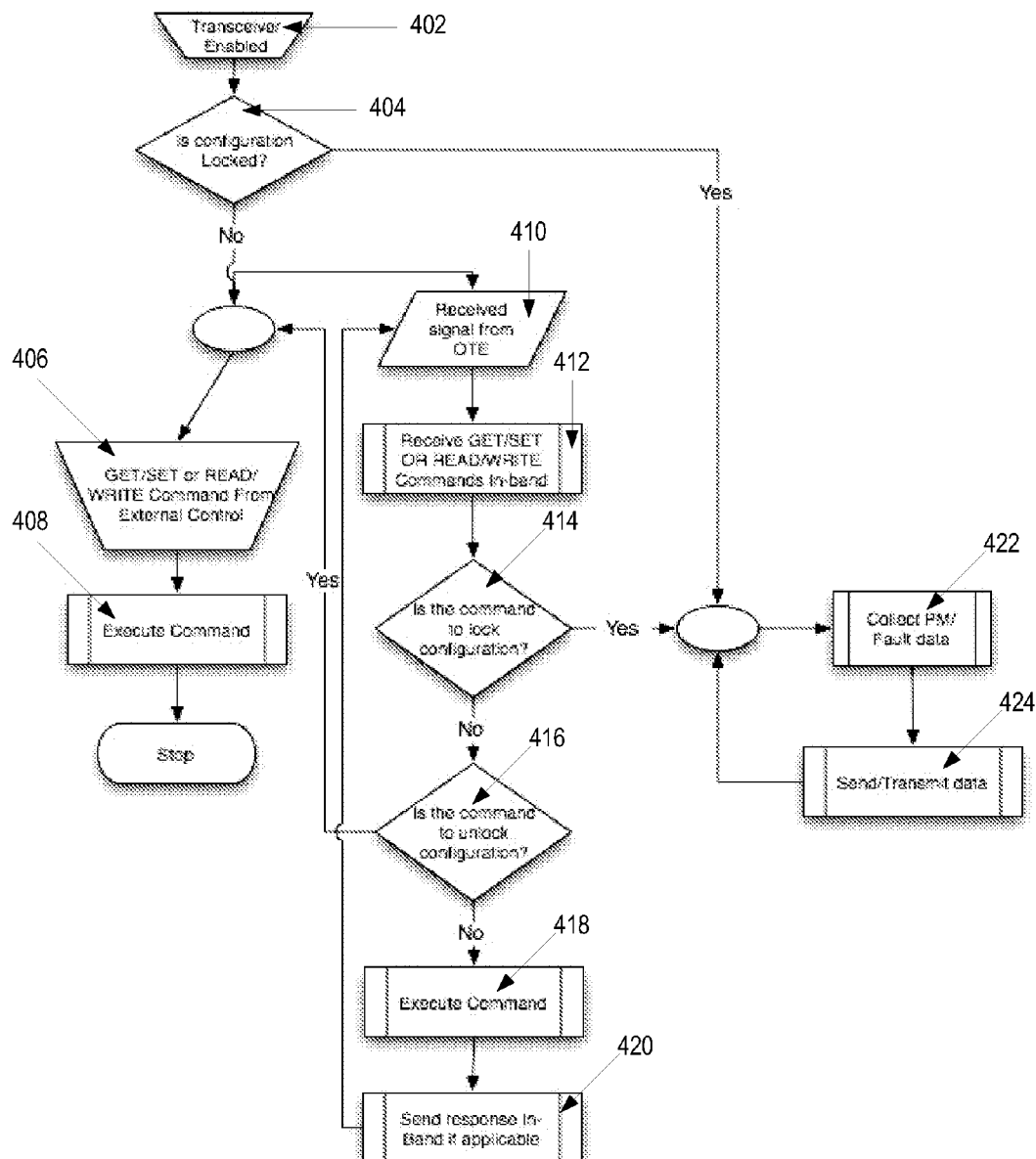
Figure 4: Transceiver function in CPE

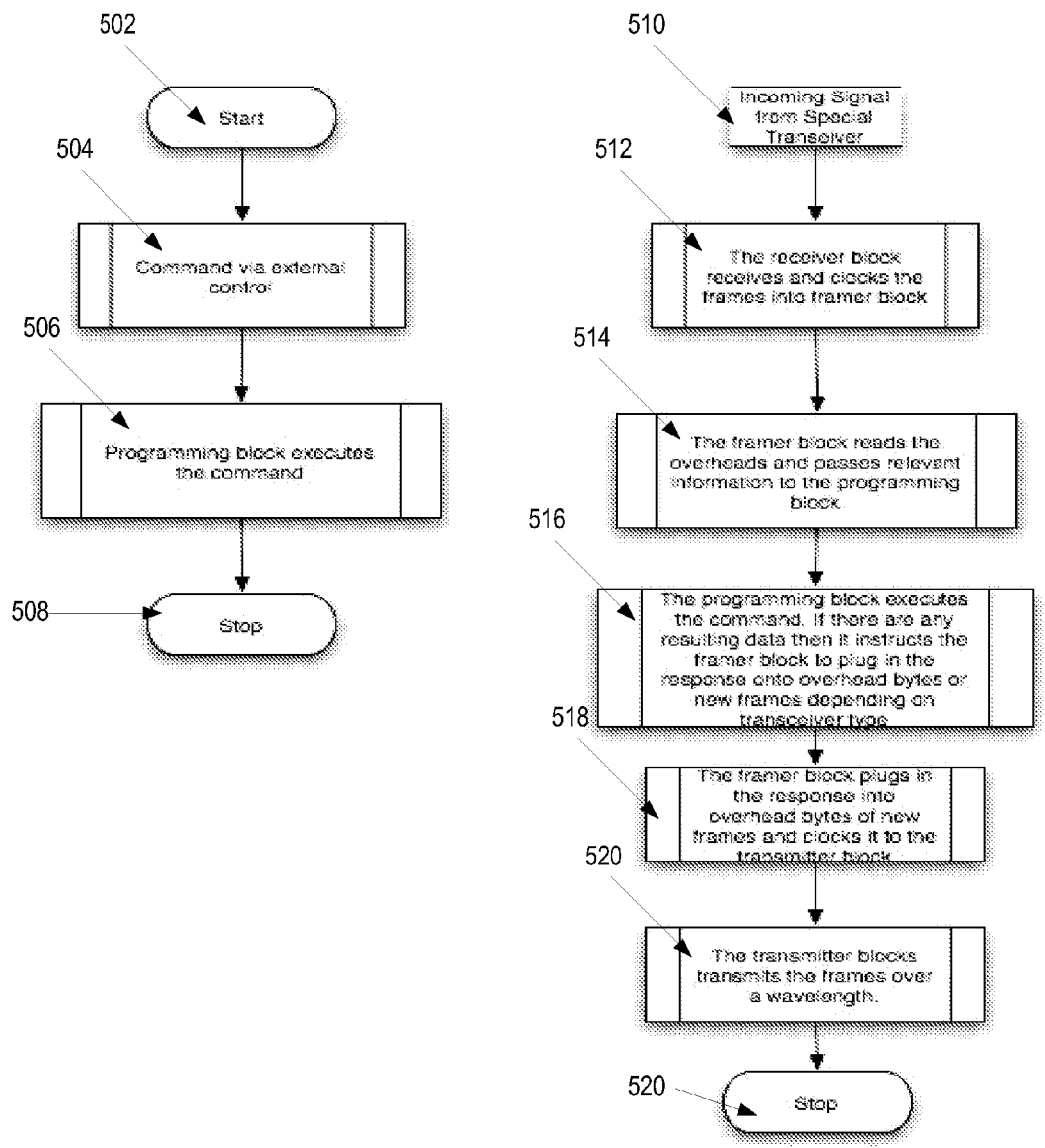
Figure 5: Transceiver Behavior in CPE Pre-Lock

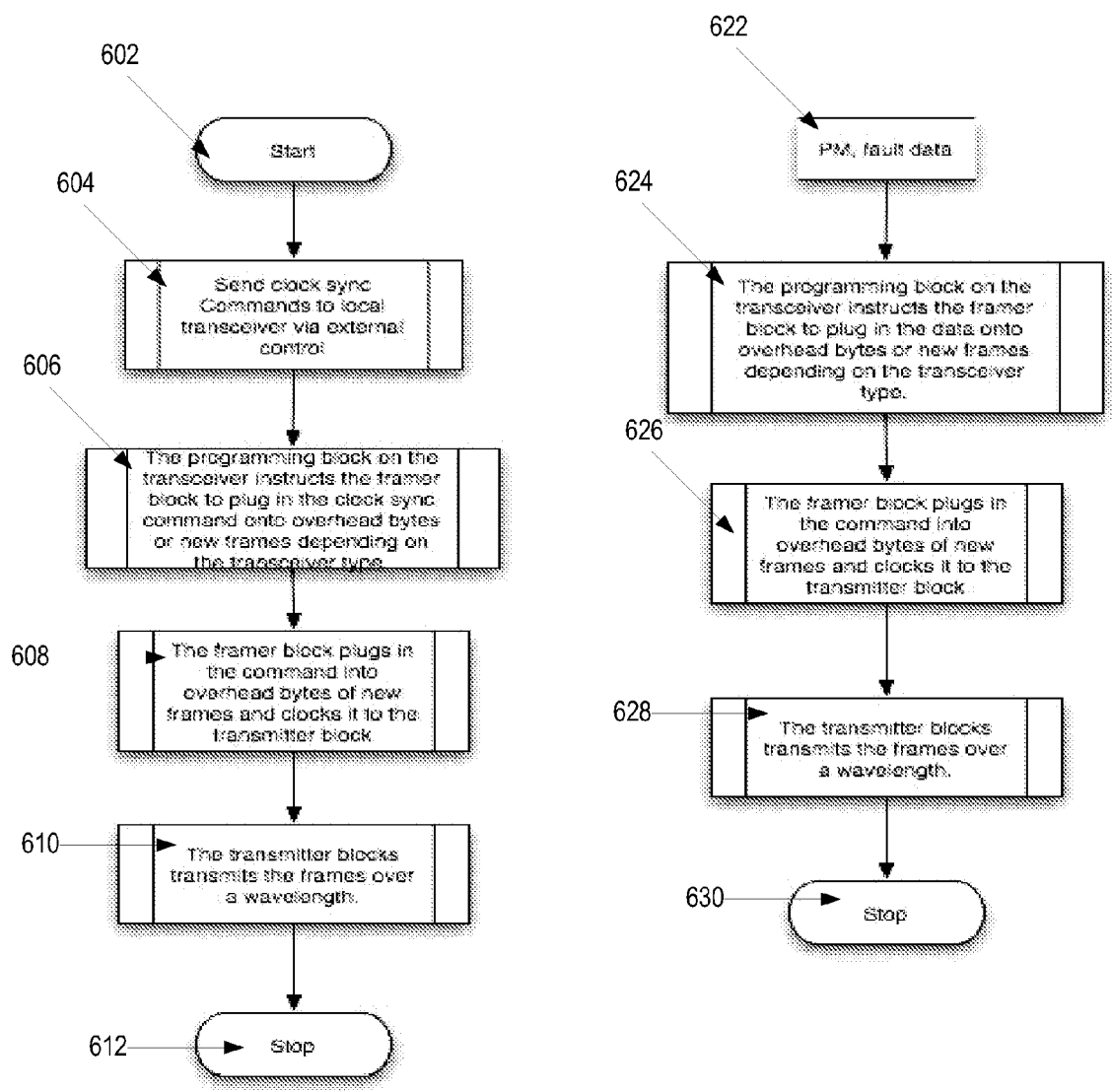
Figure 6: Transceiver Behavior in CPE Post-Lock

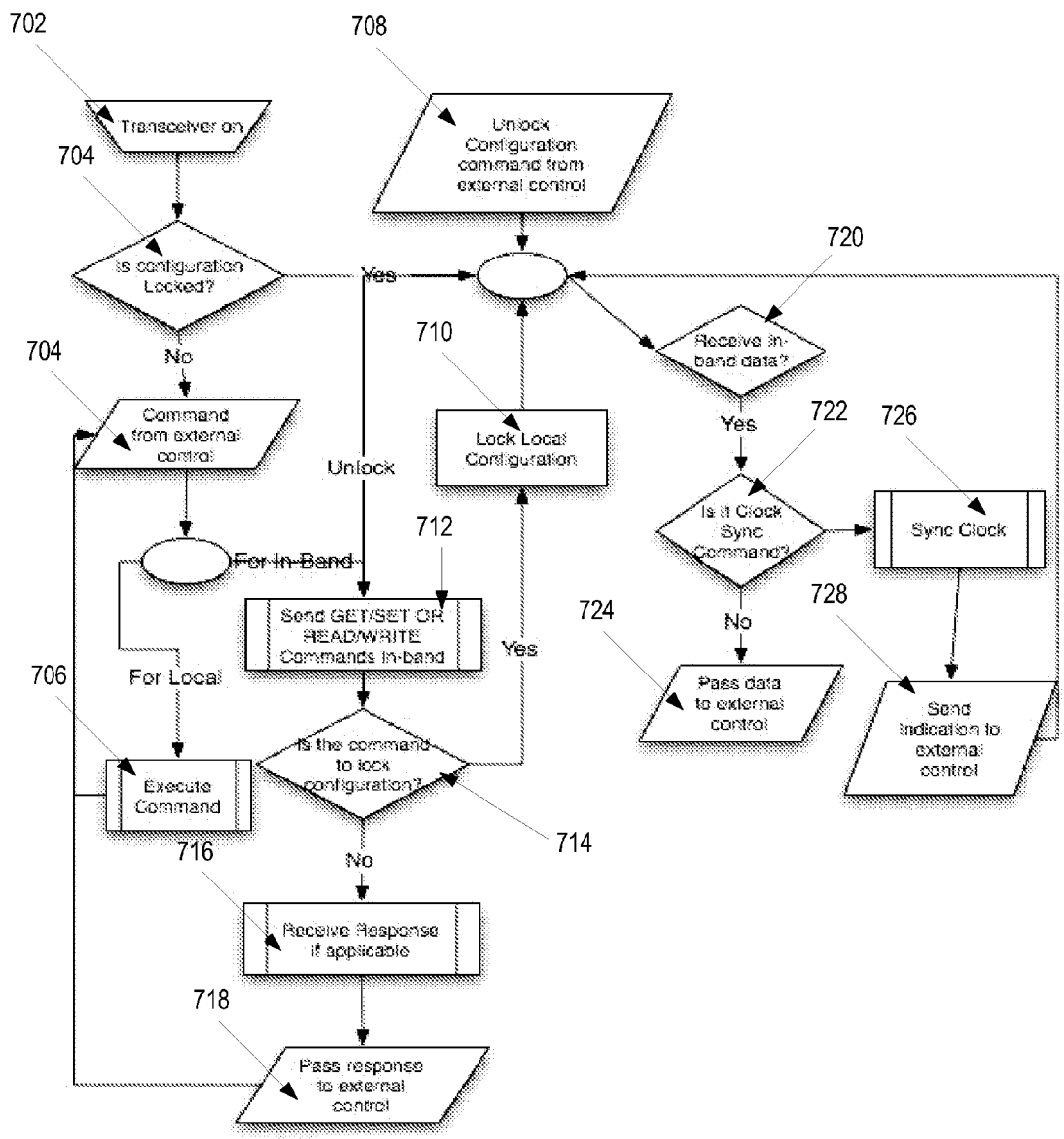
Figure 7: Transceiver function in Special Module

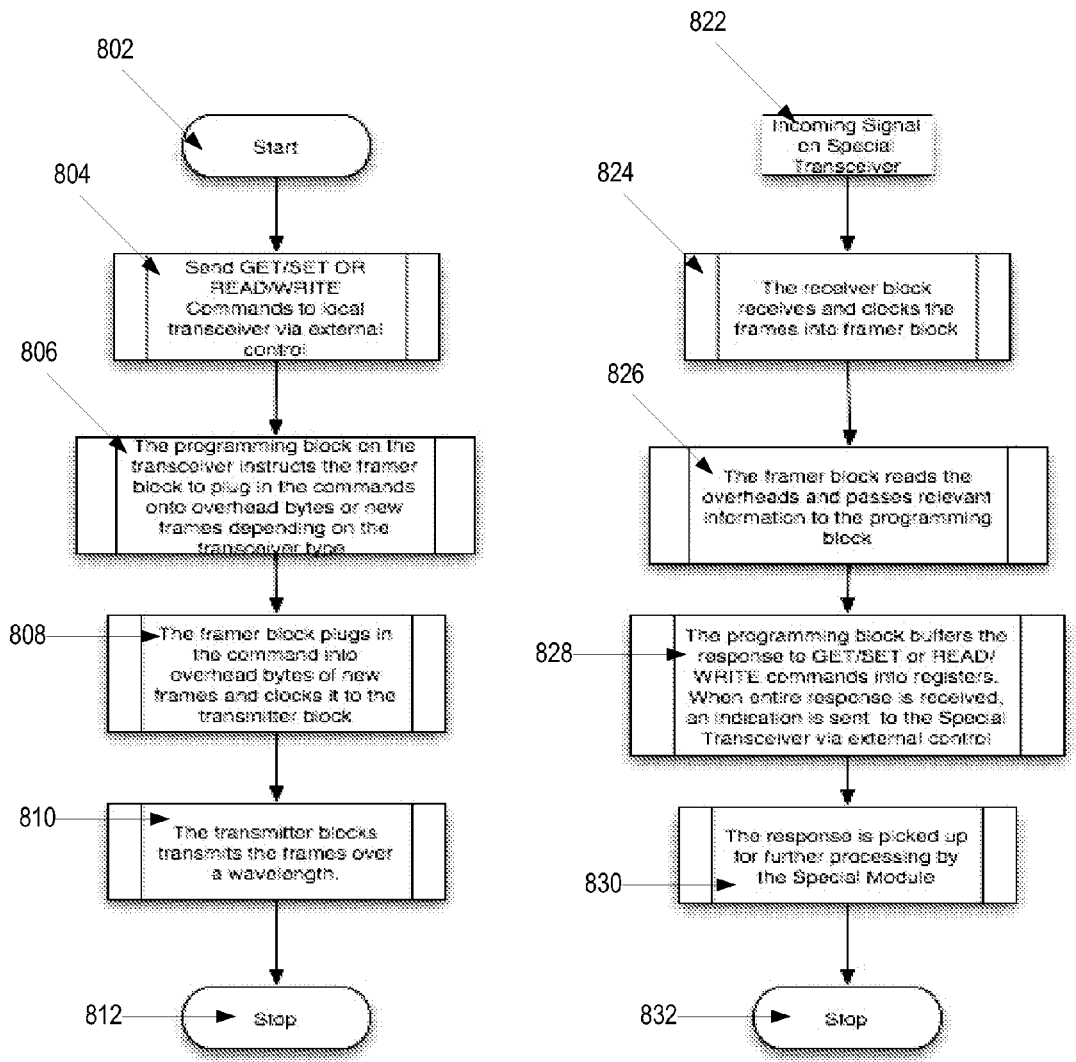
Figure 8: Transceiver Behavior in Special Module Pre-Lock

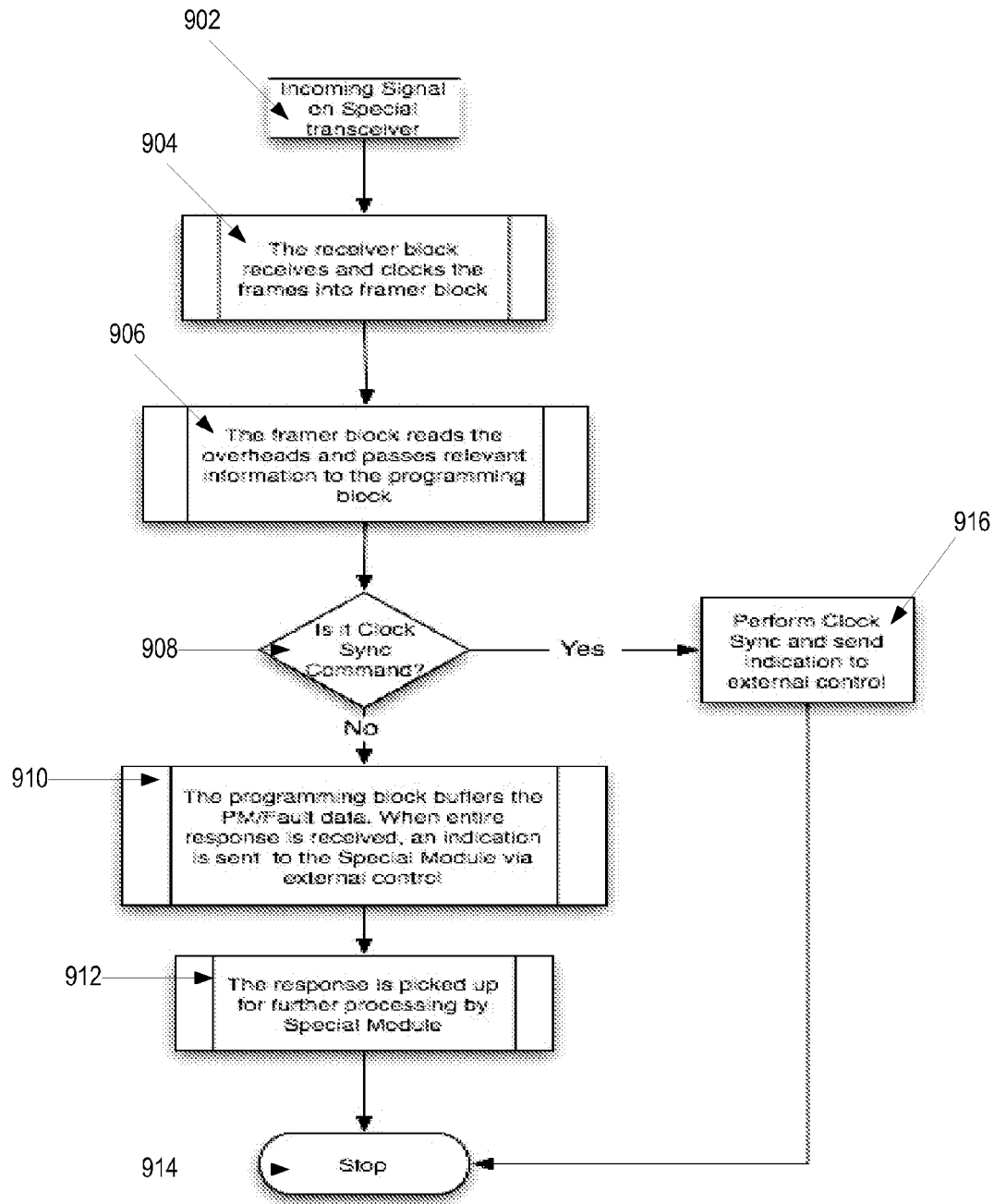
Figure 9: Transceiver behavior in Special Module Post-Lock

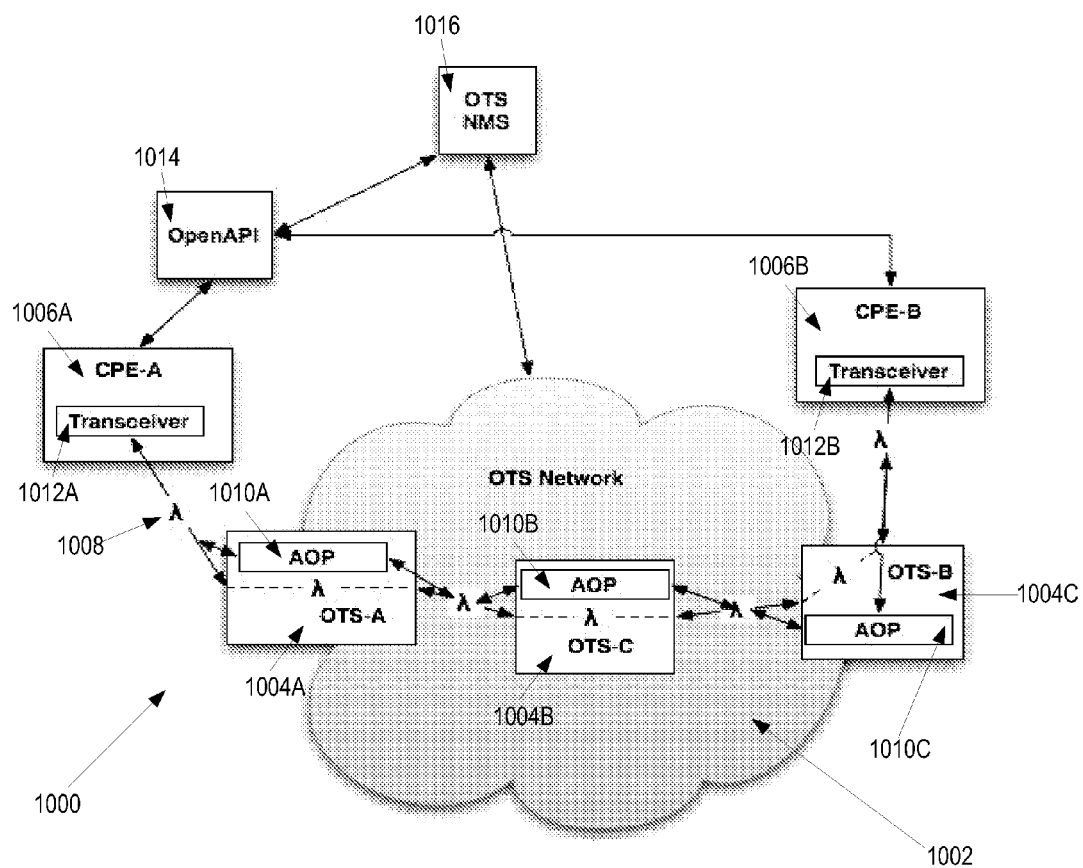
Figure 10: End to End Light Path Setup with In-Band OAM

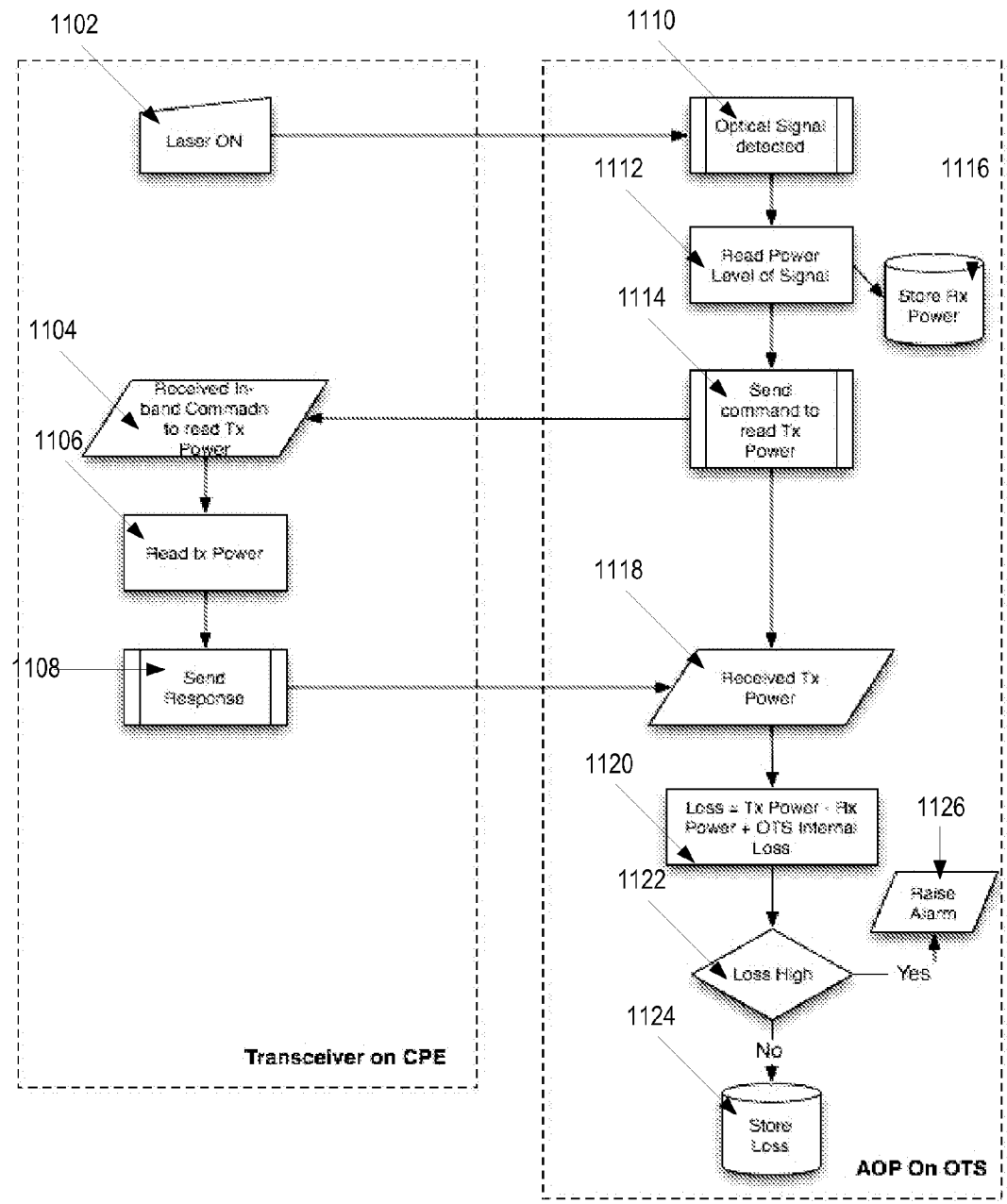
Figure 11: CPE-OTS Link Loss Meaurement

US 8,687,964 B2

IN-BAND CONTROL MECHANISM

CROSS-REFERENCE TO RELATED APPLICATIONS

This application claims the benefit of U.S. provisional patent application No. 61/422,616, entitled "In-Band Control Mechanism", filed Dec. 13, 2010.

FIELD

Embodiments of the invention relate to the field of configuring network equipment; and more specifically, to the in-band configuration and management of Wavelength Division Multiplexed (WDM) optical transmission equipment over an optical link.

BACKGROUND

In an optical network, optical circuits are typically set up between pairs of end points. The equipment at both ends needs to be configured in a consistent fashion in order to be compatible and enable the successful transfer of information. While in service, both end points need to have their performance monitored so that the service can be properly managed. Both these actions (configuring and managing) become difficult if those end points are provided by different vendors because each vendor has its own management system. Additionally, there may be difficulty physically accessing one or both ends if they are remote from the management entity. If it exists, a separate communications path to reach the remote end point will have security issues associated with it. These problems become more complicated in the case of Wavelength Division Multiplexed (WDM) optical networks.

WDM circuits originate and terminate at a WDM transceiver function. The transceiver converts electrical signals into optical signals using a laser and back from optical to electrical using a photodetector. In the case of signals that are intended to go through ROADMs, there is generally an Optical Transport Network (OTN) framer with Forward Error Correction (FEC) capability associated with the WDM transceiver. In this instance, it is important to consider the two together so this combination is referred to as "OTN and WDM transceiver functions".

There are complex interactions between the OTN & WDM transceiving function and optical network elements such as Reconfigurable Optical Add/Drop Multiplexors (ROADMs), containing switching, amplification and dispersion compensation functions, which make it important for the system managing the end to end optical circuit to have detailed information about all aspects. For this reason, it has been common industry practice for the ROADM and OTN and WDM transceiver line cards to be supplied from the same vendor. This practice requires third party equipment to connect to the WDM network using additional optical-to-electrical-to-optical conversion steps to access the OTN and WDM transceiver line card. Such steps add complexity and cost.

There have been attempts to place the OTN and WDM transceiver directly on the third party equipment. In an 'alien wavelength' approach, the ROADM and associated management system does not communicate with the end OTN and WDM transceiver functions so there is no management of the end-end optical link. Another alternative is to have a physical communications path between the management system and the end points that is separate from the fibers over which the end-end lightpath is set up for the exchange of user information. The current invention proposes a means to be able to remotely configure and manage WDM transceivers located in third party equipment by communicating over the same fiber used for information transfer.

SUMMARY

A method and apparatus of managing remote third party OTN & WDM transceiver equipment using the same fibers used for end user data exchange is described. A network device collects management instructions for the OTN & WDM transceiver equipment, assembles this management information into the overhead of a data frame and transmits on an optical link directly coupled to the network device. The optical network is configured to switch this optical signal to the OTN & WDM transceiver. The WDM transceiver function converts the optical signal to an electrical one and the OTN function extracts the management instructions from the OTN overhead. A processor associated with the OTN framer function acts on that information. The management instructions include the instruction to periodically and continuously, load certain performance, alarm and/or informational data into its OTN overhead and transmit that to the remote end. Network-based monitoring equipment can optically sample the signal and extract this information, allowing the network-based device to gain knowledge of conditions at the end points.

BRIEF DESCRIPTION OF THE DRAWINGS

The invention may best be understood by referring to the following description and accompanying drawings that are used to illustrate embodiments of the invention. In the drawings:

FIG. 1 illustrates an optical transport network and optical transceiver function blocks on network device according to one embodiment of the invention;

FIG. 2 illustrates a lightpath in the optical transport network according to one embodiment of the invention;

FIG. 3A illustrates in-band management in configuration mode according to one embodiment of the invention;

FIG. 3B illustrates in-band management in in-service monitoring mode according to one embodiment of the invention;

FIG. 4 illustrates an exemplary flow diagram of transceiver functions in a customer premise equipment (CPE);

FIG. 5 illustrates an exemplary flow diagram of transceiver functions in a customer premise equipment pre-lock;

FIG. 6 illustrates an exemplary flow diagram of transceiver functions in a customer premise equipment post-lock;

FIG. 7 illustrates an exemplary flow diagram of transceiver functions in special module;

FIG. 8 illustrates an exemplary flow diagram of transceiver behavior in a special module pre-lock;

FIG. 9 illustrates an exemplary flow diagram of transceiver behavior in a special module post-lock;

FIG. 10 illustrates an end to end lightpath setup in in-band operation, administration, and management (OAM) according to one embodiment of the invention; and FIG. 11 illustrates an exemplary flow diagram of measuring CPE-Optical Transport System (OTS) link loss.

DETAILED DESCRIPTION

The following description describes methods and apparatus of method and apparatus of processing a plurality of optical signals. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

A method and apparatus of managing, in-band, customer premise equipment is described. A network device collects customer premise equipment management information and assembles this management information into overhead of a data frame that is to be transmitted on an optical link coupled to the network device. Furthermore, the network device data frame that includes the customer premise equipment management information. The network device can be the customer premise equipment or the optical node coupled to the customer premise equipment by the optical link.

In one embodiment, data is transmitted and/or received in frames. Each frame of data includes overhead data and payload data. In this embodiment, the overhead can contain data that is used to characterize the payload of the frame (pointer to the payload, forward error correcting code, additional overhead bytes, etc.). In addition, the overhead can include information that is used to manage, configure, and monitor the OTN and WDM transceiver residing in CPE. Furthermore, the payload data is the end user data intended to be transported across the OTN.

FIG. 1 illustrates an optical transport network (OTN) and WDM transceiver functions blocks 100 on a network device according to one embodiment of the invention. In FIG. 1, the network device can be the CPE and/or the ROADM. In one embodiment, an optical node is the ROADM or an optical cross-connect device. While in one embodiment, OTN and WDM transceiver function blocks 100 is part of a line card on the CPE, in alternate embodiments, the OTN and WDM transceiver function blocks 100 is part of a line card on the ROADM. For example and in one embodiment, as will be described below, a CPE transceiver can include OTN and WDM transceiver function blocks 100 that is used to manage, configure, and/or monitor the CPE transceiver. In this embodiment, the OTN and WDM transceiver function blocks 100 may be in a line card that is owned by a network operator that is a different entity than the entity that owns the CPE. This embodiment is further described with reference to FIGS. 2-6 below. As another example and in another embodiment, as will be described below, the ROADM can include a special line card with a ROADM transceiver that includes OTN and WDM transceiver function blocks 100. This ROADM transceiver is used to manage, configure, and/or monitor the CPE transceiver. This embodiment is further described with reference to FIGS. 7-9 below.

In FIG. 1, OTN and WDM transceiver function blocks 100 includes a framer block 102 coupled to a transmitter block 104, monitoring function block 106, and receive block 108. In addition, the monitoring function block 106 is coupled to a transmitter block 104 and a receive block 108.

In one embodiment, the framer block 102 frames the high-speed packet data 122 using the framer 110 into frames suitable to be transmitted by the transmitter block 104. For example and in one embodiment, framer block 102 frames the high speed data 122 into frames for 10G OTN frames, 10G Synchronous Optical Networking (SONET) frames, 1G/10G Ethernet Media Access Control (MAC) frames with 802.3ah OAM support, etc. and/or other transport networks known in the art. In another embodiment, framer block 102 receives management data from monitoring function block 106 and incorporates that data into various overhead bytes defined by the specific framing protocol in use and transmits the combined user data and overhead to the transmitter block 104). In one embodiment, the function of monitoring function block 106 is for relatively low speed monitoring and control. In the transmission direction, monitoring function block 106 sends this information to framer block 102, which inserts it into the overhead and sent out on the optical line via the transmission block 104. It is not delivered to the host line card. At the receive end, the overhead is extracted by the framer block 102 and delivered to monitoring function block 106. The information is either terminated there or send to 'external control', depending on the type of information or situation.

While in one embodiment, the OTN and WDM transceiver function blocks 100 includes the framer block 102, in alternate embodiments, the framer block 102 is not part of the optical transport network OTN and WDM transceiver function blocks 100, but is coupled to the OTN and WDM transceiver function blocks 100. Furthermore, while in one embodiment, blocks 102, 104, 106, and 108 of the OTN and WDM transceiver function blocks 100 are included in the transceiver of a line card, in alternate embodiment, some of these blocks can be in the part of the transceiver and the other block(s) can be included in the line card outside of the line card transceiver. For example and in one embodiment, blocks 104 and 108 are part of the line card transceiver and blocks 102 and 106 are included in the line card but not in the transceiver.

In one embodiment, transmitter block 104 includes laser 112 and laser bias control 114. In one embodiment, laser 112 is a laser suitable to transmit data over the optical network (e.g., peak wavelengths of 780, 850, 1310, 1550 nm; single or multi-mode lasers, etc.). In one embodiment, laser 112 is configurable to transmit on multiple different wavelengths. In one embodiment, when laser 112 is part of the CPE transceiver, laser 112 originates the wavelength for the optical circuit. In this embodiment, these transmitted wavelengths are treated as alien wavelengths by the ROADM. The ROADM switches these alien wavelengths along the optical circuit. In one embodiment, laser bias control 114 controls the bias of the laser 112 and can be configured by the monitoring function block 106.

Monitoring function block 106, in one embodiment, includes monitoring/programming device 116 that monitors the framer block 102, the transmitter block 104, and receive block 108. In one embodiment, the monitoring/programming device 116 collects data generated by these blocks (102, 104, and 108) and transmits this data to the optical node coupled to the CPE that includes the OTN and WDM transceiver function blocks 100. In this embodiment, the CPE can transmit monitoring data about the lightpath to the optical node over the light. This is further described in FIG. 6 below. While in one embodiment, the monitoring functions of the monitoring/programming device 116 is used by the CPE transceiver, in alternate embodiments, the monitoring functions can be used in the ROADM transceiver to gather monitoring data from the remote CPE OTN&DWM transceiver that can be sent to a Network Management Station (NMS) that is used to manage the ROADM.

In another embodiment, the monitoring/programming device 116 programs the some, one, or all of the blocks of the OTN and WDM transceiver function blocks 100. For example and in one embodiment, monitoring/programming device 106 programs the transmitter block 104 to transmit data on the optical circuit. In this embodiment, monitoring/programming device 106 can turn on the laser 112, configure a wavelength for the laser 112 to use, turn off the laser 112, lock/unlock the configuration of the OTN and WDM transceiver function blocks 100, etc. Programming of the blocks in OTN and WDM transceiver function blocks 100 for a CPE transceiver is further described in FIGS. 4 and 5 below.

In one embodiment, the receiver block includes a post-amplifier clock data recovery (CDR) chip 118 coupled to a transimpedence amplifier (TIA) 120, which in turn is coupled to an APD Receiver 124 that is coupled to an APD Bias control 122.

FIG. 2 illustrates different optical circuits between CPE in the optical transport network according to one embodiment of the invention. In FIG. 2, CPE-A 204A communicates with CPE-B 204B over multiple optical circuits (e.g., optical circuits 206A-A, 208A-D, and 210A-C) via optical network 200.

While in one embodiment, there are three optical circuits coupling the two CPEs 204A-B, in alternate embodiments there can more or less optical circuits coupling two different CPE. For example and in one embodiment, one optical circuit can couple the CPEs, or more than one optical circuit can couple the CPEs.

The optical network 200 is a collection of optical nodes (e.g., CPEs 204A-B and OPTs 202A-D) interconnected by links made up of fiber-optical cables. In one embodiment, an optical node is a ROADM or an optical cross-connect device. Cable trunks are interconnected with optical cross-connects (OXCs), and signals are added and dropped at a reconfigurable optical add/drop multiplexers (ROADMs). The optical nodes that allow traffic to enter and/or exit the optical network are referred to as Add/drop nodes; in contrast, any optical nodes that do not are referred to as pass-thru nodes (an optical network need not have any pass-thru nodes). Each optical link interconnects two optical nodes and typically includes an optical fiber to carry traffic in both directions. There may be multiple optical links between two optical nodes. For example and in one embodiment, in FIG. 2, OPT-A 202A and OPT-B are examples of ROADMs as these network devices are coupled to the CPEs. OPT-C 202C and OPT-D are examples of OXCs as these optical nodes interconnect the other optical nodes.

A given fiber can carry multiple communication channels simultaneously through a technique called wavelength division multiplexing (WDM), which is a form of frequency division multiplexing (FDM). When implementing WDM, each of multiple carrier wavelengths (or, equivalently, frequencies) is used to provide a communication channel. Thus, a single fiber looks like multiple virtual fibers, with each virtual fiber carrying a different data stream. Each of these data streams may be a single data stream, or may be a time division multiplex (TDM) data stream. Each of the wavelengths used for these channels is often referred to as a lambda.

A lightpath is a one-way path in an optical network for which the lambda does not change. For a given lightpath, the optical nodes at which its path enters and exits the WDM network are respectively called the source node and the destination node; the nodes (if any) on the lightpath in-between the source and destination nodes are called intermediate nodes. An optical circuit is a bi-directional, end-to-end (between the OTN and WDM transceivers residing on a pair of CPE) path through the optical WDM network. Each of the two directions of an optical circuit is made up of one or more lightpaths. Specifically, when a given direction of the end-to-end path of an optical circuit will use a single wavelength, then a single end-to-end lightpath is provisioned for that direction (the source and destination of that lightpath are the OTN and WDM transceivers that reside on the CPE). However, in the case where a single wavelength for a given direction will not be used, wavelength conversion is necessary and two or more lightpaths are provisioned for that direction of the end-to-end path of the optical circuit. Thus, a lightpath comprises a lambda and a path (the series of network devices (and, of course, the interconnecting links) through which traffic is carried with that lambda).

In FIG. 2, in one embodiment, each lightpath in an optical circuit originates from a transceiver in a CPE. For example and in one embodiment, the transceivers 212A in CPE-A 204A originate the wavelength(s) in optical circuit 206A-D, 208A-D, and 210A-C that are directional from CPE-A 204A to CPE-B 204B. In the reverse direction, the transceivers 212B in CPE-B 204B originate the wavelength(s) in optical circuit 206A-D, 208A-D, and 210A-C that are directional from CPE-B 204B to CPE-A 204A.

In one embodiment, the ROADMs (e.g., OPT-A 202A and OPT-B 202B) can remotely configure and monitor the optical circuits used by the CPEs (e.g., CPE-A 204A and CPE-B 204B). Furthermore, in this embodiment, because the CPEs originate these wavelengths, the ROADMs switch the wavelengths originating from the CPE. In this embodiment, the OXC (OPT-C 202C and OPT-D 202D) switch the wavelengths on the lightpaths 206 and 208. Alternatively, in another embodiment, the ROADM can originate some wavelengths and switch others. Furthermore, in another embodiment, a ROADM can act as an OXC as well as a ROADM.

As described above, in one embodiment, the ROADM can remotely configure the CPE so that the CPE can transmit and receive the wavelengths in the optical circuits. Furthermore, the ROADM can remotely monitor the CPE. In this embodiment, this allows the service provider of the optical network to remotely manage, configure, and/or monitor the CPE. In one embodiment, the CPE managing, configuring, and/or monitoring can be performed in-band. In one embodiment, in-band configuration and monitoring means that the commands, feedback, information, etc. used for the CPE management, configuration, and/or monitoring are communicated on the same lightpath that is being managed, configured, and/or monitored. Alternatively, in-band configuration and monitoring can be accomplished by using different wavelengths than the one used to transport the user data, low-level modulation of the user data, and/or special bits/bytes that are not in OTN overhead.

Alternatively, the ROADM can perform the CPE management, configuration, and/or monitoring out-of-band or a mixture of in-band and out-of-band. Out-of-band management, configuration, and/or monitoring means that the commands, feedback, information, etc. used for the CPE management, configuration, and/or monitoring, respectively, are communicated on a different communication path that the lightpath being managed, configured, and/or monitored. For example and in one embodiment, out-of-band management, configuration, and/or monitoring could be done on a different electrical or optical link to the ROADM doing the CPE configuration and/or monitoring.

In order to accomplish the in-band CPE management, configuration and/or monitoring, in one embodiment, the transceiver of the CPE includes a monitoring/programming module, such as monitoring/programming device 116 included in an OTN and WDM transceiver function blocks 100. This monitoring/programming module can react to in-band configuration and/or monitoring commands transmitted by the ROADM, give feedback to those commands, and transmit monitoring data to the ROADM. In one embodiment, the monitoring/programming module retrieves the commands from the framing header included in the frames transmitted to the CPE by the ROADM. In this embodiment, the CPE transmits the configuration feedback and/or monitoring information in the overhead of frames transmitted by the CPE.

FIGS. 3A-B illustrate two modes that a CPE can operate in: a configuration mode (FIG. 3A) and an in-service monitoring mode (FIG. 3B). Furthermore, the transceiver in the special line card on the ROADM can operate in a configuration mode (FIG. 3A) and an in-service monitoring mode (FIG. 3B). In particular, FIG. 3A illustrates in-band management of a transceiver(s) 306 of a CPE 302 in the configuration mode according to one embodiment of the invention. In FIG. 3A, the CPE 302 communicates with a ROADM 304 over optical circuit 318. CPE 302 includes one or more transceiver(s) in a line card 306 that originate the wavelength for the lightpath to the ROADM and receive the lightpath transmitted from the ROADM. In addition, the ROADM includes a special line card 310 with a transceiver 308 and a CPE I/O line card 312. In one embodiment, the CPE I/O line card 312 is coupled to the CPE 302 via the optical circuit 318 and the special line card 310 is coupled to the CPE I/O line card 312. In one embodiment, the arrangement shown above would be a typical logical setup for this application. Example of CPE would be a Cisco CRS-1 Router, a Juniper M120 series switch/router etc.

For example and in one embodiment, and referring to FIG. 3a, the point-to-point arrangement between the transceiver 308 and the CPE transceiver 306 is utilized in the configuration mode. In this embodiment, the CPE transceiver 306 is managed without affecting the payload carried on the transmitted optical signal. Furthermore, the CPE transceiver is managed without configuring a special circuit on the optical circuit that is used for the in-band management. To achieve this, ROADM 304 uses a special module (transceiver 308) inside the ROADM that hosts the same or functionally similar transceiver 306 as the one present on the CPE. In this mode, the transceiver 308 is able to write data into bytes in the OTN frame overhead and send them to the CPE transceiver 306 where the information is extracted and acted upon. In this mode, the CPE transceiver 306 communicates with the special transceiver 308.

FIG. 3B illustrates in-band management in in-service monitoring mode according to one embodiment of the invention. In FIG. 3B, a tapping arrangement of the optical signal from CPE I/O line card 312 to the special line card 310 is utilized in this mode. In one embodiment, the optical circuit 318 is used to connect the transceiver 306 with some remote peer (e.g. another CPE with an optical transceiver) via the DWDM network 322. In this embodiment, the transceiver 308 is not intended to be the receiver of this information but is able to 'silently' and asynchronously tap the signal to allow it to extract the information that it instructed the transceiver 306 to insert. The special line card 310, as shown in FIG. 3B, possesses a capability to tap into the signal carried into the ROADM over the optical circuit 318. The Special Transceiver 308 is able to receive a copy of the data by tapping arrangement from CPE I/O Line card 312 to the special line card 310. In this mode of operation, there are two Remote Transceivers communicating with each other and the Special Transceiver 308 monitors traffic and does not generate data/commands to send to either Remote Transceivers. Instead, the Special Transceiver 308 'snoops' (e.g., passively monitor) information that the CPE Transceivers(s) 306 inserts in the overhead. By carefully monitoring the information that goes into the overhead, this can be used by the service provider to monitor the health of the connection and determine whether service level agreements (SLA) have been met.

In one embodiment, the transceiver 308 on the special module 310 is not dedicated to one CPE 302 and subsequently can configure and/or monitor multiple CPE transceivers 306 on one or more CPEs 302. For example and in one embodiment, transceiver 308 can manage, configure, and monitor multiple CPE transceivers.

The special line card 310 may contain other devices on it that uses the tapped out signal for monitoring purposes. One example of such a module is the AOP (Advanced Optical Performance) line card used on the TN320 ROADM. The AOP line card also contains an optical channel monitoring device, optical switches and tunable optical filters.

Referring to FIG. 1 above, in one embodiment, the transmit/receive/framer blocks control could be provided through a monitoring function device/chip. In this embodiment, the monitoring function device or chip exercises control of the transmit block and receive block based on frames received by the framer block and via external control. The monitoring function device could be physically implemented in number of ways. As an example but not limited to programmable ASIC. External control could be through, but not limited to a microprocessor or FPGA.

In one embodiment, the transceiver 308 is a shared resource, able to connect to multiple CPEs' transceivers 306. The In-Service monitoring mode, each CPE transceiver 306 will place information in its overhead to be 'repetitively transmitted' for a period of time (e.g. 15 minutes). This allows the transceiver 308, over a reasonable period of time, to asynchronously snoop and collect data from all the CPE transceivers 306. After that interval, each CPE transceiver 306 can update its information and transmit that information for the next time period. In the event that the special line card 310 snoops data during a time when the information is changing, it will ignore the first portion of data and collect full frame information on the new period. In one embodiment, it is not required, but to minimize the amount of data collected, the transceiver 308 collects information for those signals that it adds and drops (e.g. if signal "K" is a pass-through at a particular ROADM, the transceiver 308 residing in that node will not collect and store SLA related information for signal K. This transceiver 308 may snoop Tail Trace Identifier (TTI) information to ensure it is the correct signal or perform other diagnostics but in general, it is not envisaged that data would be collected for through signals because responsibility for collecting this information should reside at the network ingress and egress.

In order to support the two different modes of the system, the transceivers perform one or more various functions. In one embodiment, these transceivers 308 on the ROADM supports the following functions in the configuration mode:

Send GET/SET (or READ/WRITE) messages to the CPE transceiver 306 using a pre-arranged messaging channel, format and/or protocol.

READ responses to the GET OR READ messages sent by the transceiver 306 using pre-arranged messaging channel, format and protocol.

Lock the CPE transceiver 306 configuration by performing a SET/WRITE operation on the CPE transceiver 306 to disallow any change in the CPE transceiver 306 configuration via the external control interface. In one embodiment, the CPE transceiver 306 will silently discard commands issued after the lock from the external control interface on transceiver 308. In another embodiment, the lock function is not required for the CPE to be in the in-service monitoring mode.

In the monitoring mode, the transceiver 308 supports several different read functions in the in-service monitoring mode:
READ performance (PM) data after lock.
READ fault/alarm data after lock.
READ clock sync message after lock.

The CPE transceivers 306 also support a number of functions. In the configuration mode, the remote transceiver supports:

Read and take action on in-band GET/SET OR READ/WRITE messages received from the transceiver's OTN and WDM transceiver function blocks 100.

Respond to READ commands from external control.

Respond to write commands from external control when the configuration is not locked (possible only via in-band messages). For example and in one embodiment, when not locked, the transceiver 306 can respond to commands from either CPE 302 and/or transceiver 308.

Furthermore, in the in-service monitoring mode, the remote transceiver supports the following functions:

Repetitively populate performance monitoring (PM) data into signal overhead.

Repetitively populate fault/alarm data into in-band overheads.

Populate Clock Sync message into in-band overheads.

Silently ignore configuration changes received via external control interface.

FIG. 4 illustrates an exemplary flow diagram of transceiver functions in transceiver CPE. In FIG. 4, process 400 begins by enabling the CPE transceiver at block 402. While in one embodiment, process 400 enables the CPE transceiver locally (e.g., a technician installing the CPE and manually brings up the CPE transceiver), in alternative embodiments, process 400 remotely enables the transceiver (e.g., the CPE transceiver receives a signal on the optical circuit, which triggers the monitoring/performance device to enable the transmit side of the CPE transceiver to come up).

At block 404, process 400 determines if the configuration of the CPE transceiver is locked. In one embodiment, a locked CPE transceiver configuration means that the CPE transceiver configuration cannot be modified unless the configuration is first unlocked. For example and in one embodiment, a locked CPE transceiver configuration is used in the in-service monitoring mode, so the ROADM can monitor the wavelength(s) communicated with the CPE. If the CPE transceiver configuration is not locked, execution goes to block 406 or block 410 If the CPE transceiver configuration is locked, execution goes to block 422.

Process 400 executes a GET/SET or READ/WRITE command that is received from external control at block 406. In one embodiment, process 400 receives the command from external control (e.g., the special transceiver of the ROADM sending GET/SET or READ/WRITE commands embedded in the frame overhead, etc.). Once process 400 receives this command, process 400 executes the command on the appropriate modules (e.g., the blocks 102, 104, 106 and/or 108 of OTN and WDM transceiver function blocks 100 in FIG. 1 above). For example and in one embodiment, if the received GET command is to configure the laser of the CPE transceiver to use a certain wavelength is received, process 400 configures the CPE transceiver to use that wavelength. At block 408, process 400 executes the received command. For example and in one embodiment, the received command can be a command to set a configuration parameter, read a configuration parameter, report monitoring data, lock/unlock the CPE configuration, etc.

At block 410, process 400 receives a signal from the OTE. In one embodiment, the signal received from the OTE is an in-band signal received over the optical circuit coupled to the CPE. Process 400 receives a GET/SET or READ/WRITE command in-band at block 412. In one embodiment, the in-band commands are received in the OTE from block 410 above. For example and in one embodiment, the in-band commands are received in overhead of the frames of the OTE signal. In another embodiment, this signal could be a different wavelength, a low level modulation of the payload, and/or special bits/bytes that are not part of the OTN overhead.

At block 414, process 414 determines if the received command in block 412 is a configuration lock command. In one embodiment, a configuration lock command is a command that prevents further configuration of the CPE transceiver until a corresponding unlock command is received. If a configuration lock command is received, process 400 collects PM and fault data at block 422. For example and in one embodiment, process 400 collects monitoring and/or fault data such as bit error rate, transmission power, module temperature, laser drive currents, transceiver alarms such as loss of optical signal, etc. Furthermore, at block 424, process 400 sends the collected monitoring and/or fault data. In one embodiment, process 400 can send this data it periodically, in response to an in-band or out-of band command, etc.

If the received in-band command is not a lock configuration command, process 400 determines if this received command is an unlock command at block 416. If this is an unlock command, process 400 unlocks the configuration so that the configuration of the CPE transceiver can be modified. In one embodiment, unlocking the configuration can be used to reconfigure the CPE transceiver. Execution proceeds to blocks 410 and 406, where process 400 waits for an out-of-band command (with execution going to block 406) or an in-band command (with execution going to block 410).

If the received command is not an unlock command, process 400 executes the command at block 418. In one embodiment, process 400 executes the command as described above with reference to block 408. At block 420, process 400 sends a response to the executed command.

In FIG. 4, process 400 receives command either via external control (e.g., out-of-band) or in-band. In the in-band embodiment, process 400 retrieves the command from overhead data. FIG. 5 illustrates an exemplary flow diagram of transceiver functions in a customer premise equipment pre-lock to retrieve a command from either external control (blocks 502-508) or in-band (blocks 510-520). For external control received commands, process 500 starts at block 502. At block 504, process 500 receives the command. Process 500 executes the command using a programming block at block 506.

For the in-band commands, process 500 receives an incoming signal from the special transceiver. In one embodiment, at block 510, process 500 receives the incoming signal from the ROADM as described above in FIG. 3A above. Process 500 receives this signal and clocks the frames into the framer block at block 512. By clocking the frames in the signal into a framer block, process 400 enables a command that is in the overhead of the framer block to be recovered. In one embodiment, a receiving block module, such as receiver block module 108 of FIG. 1 above, would perform the framing the signal into a framer block.

At block 514, process 500 reads the overhead of the framer block and retrieves the relevant information contained in the overhead. In one embodiment, process 500 retrieves this overhead information from the receiving block and passes the relevant information to the programming block of the CPE transceiver (e.g., framer block 108 retrieves the overhead information and passes the relevant information monitoring function block 106, which includes the programming device as in FIG. 1 above). In this embodiment, the overhead information can contain data that is used to characterize the payload of the frame (pointer to the payload, forward error correcting code, additional overhead bytes, etc.). In one embodiment, in the additional overhead bytes, process 500 would retrieve this relevant information that could include in-band commands. For example and in one embodiment, an in-band command sent by a transceiver of an optical node (e.g., a ROADM) to the remote transceiver of a CPE would include commands to write data into specific registers accessible to block 106 in the remote transceiver as described in FIG. 1 above. Those registers in turn, determine operating modes of the OTN and WDM transceiver block 100. For example, the data written into one register could set the type of forward error correction (FEC) mode to be used by the FEC function in the framer block 102. In another example, the data could be written into a register that determines the wavelength that a laser of the CPE transceiver should operate at. Similarly, the optical node's transceiver can ask the remote transceiver at block 106 to return the contents of specific registers that it can assess, such as registers from the framer block 102 that indicate the count of number of errors that the FEC block was not able to correct or from the receive block 108 that would indicate the current optical signal level.

Process 500 executes the command at block 516. In one embodiment, the monitoring block, which also includes the monitoring/processing device, executes the command of the CPE transceiver (e.g., monitoring/processing device 116 of the OTN and WDM transceiver function blocks 100 of FIG. 1 above). Furthermore, if there is any resulting data from the executed command (e.g., return code, configuration/monitoring/fault data queried for, alarms etc.), process 500 inserts the resulting data into some or all of the available overhead bytes of new frames being prepared for transmission. In one embodiment, process 500 instructs the framer block of the CPE transceiver to insert this resulting data into new frames the framer block is preparing to transmit (e.g., framer block 102 of the OTN and WDM transceiver function blocks 100 receives the instruction from monitoring/processing device 116 to insert the resulting data into frames that the framer block is preparing to transmit). While in one embodiment, the resulting data fits into the available overhead bytes for one frame, in alternate embodiment this resulting data for one command can be split across multiple frames. Process 500 transmits the one or more frames over the configured wavelength of the optical circuit. In one embodiment, the transmitter block of the CPE receives the formed frames from the CPE framer block and transmits these formed frames. Process 500 stops execution at block 520.

In FIG. 5, process 500 can receive and act upon command that transmitted in-band over the optical circuit to the CPE when the configuration is not locked via external control. In this mode (CPE pre-lock), the CPE can receives commands to set a configuration parameter, read a configuration parameter, report monitoring data, lock/unlock the CPE configuration, etc. Furthermore, the CPE can receive commands to lock the CPE transceiver configuration, which puts the CPE transceiver in a post-lock or monitoring mode. In this mode, the configuration of the CPE transceiver is locked and cannot be altered without first receiving an unlock command. In one embodiment, in the post-lock mode, the CPE transceiver continuously transmits monitoring data, fault data, summary statistics collected specified time intervals (such as 15 minute time periods), alarms and/or combination thereof.

FIG. 6 illustrates an exemplary flow diagram of transceiver functions in a CPE post-lock to transmit monitoring/fault data via external control (blocks 602-612) or in-band (blocks 622-630). For external control received commands, process 600 starts at block 602. Process 600 sends a clock sync command to local transceiver by external control at block 604. In one embodiment, the local transceiver is the CPE transceiver (e.g., OTN and WDM transceiver function blocks 100 that are in the CPE). In one embodiment, external control is control commands and responses sent to the transceiver function 100 via an "out of band" control data network (e.g., a network that utilizes a different physical communications link than the optical fiber the transceivers use to communicate with each other) and is used is by a network-management station (NMS) manage, configure, and/or monitor the CPE transceiver and/or the ROADM transceiver. For example and in one embodiment, process 600 sends a clock from.

Process 600 instructs a framer block of the transceiver to insert the clock sync command onto overhead bytes of the new frames depending on the transceiver type, at block 606. In one embodiment, process 600 uses the programming device of the CPE transceiver to instruct the framer block to insert the clock sync command (e.g. monitoring/programming device 116 instructs the framer block 102 to insert the clock sync command into the overhead bytes were new frames and on the transceiver type as described as described in FIG. 1 above). By inserting in the clock sync command into the overhead bytes of the new frames, process 600 enables the sending of the monitoring/fault data in-band via the new frames.

At block 608, process 600 inserts the sync command on into the overhead bytes of the new frames and clocks it to the transmitter block. In one embodiment, process 600 uses the framer block to insert this command into the overhead bytes of the new frames. Furthermore, process 600 uses the framer block to clocks the new frames to the transmitter block. By clocking new frames with the sync command in the frame overhead, process 600 allows the transmitter block of the CPE transceiver to send this command in a new frame without affecting payload of that frame.

At block 610, process 600 transmits the frames over the wavelength of the lightpath. In one embodiment, process 600 transmits these frames over the wavelength is configured on the optical circuits that CPE transceiver is communicating. For example and in one embodiment, the transmitter block transmits the frames on the on optical link to go to the ROADM as illustrated in FIG. 2 above. Process 600 ends at block 610.

For the in-band monitoring/fault data, process 600 retrieves the PM and/or fault data at block 622. After block 622, process 600 proceeds similarly for blocks 624-628 as in blocks 606-610 above, except that process 600 uses the PM and/or fault data that is collected instead of the using the sync command. In particular, process 600 retrieves monitoring/fault data at block 622. In one embodiment, the monitoring/fault data includes bit error rate, transmission power, and/or any other monitoring/fault data known in the art, etc. In one embodiment, the local transceiver is the CPE transceiver (e.g., OTN and WDM transceiver function blocks 100 in a CPE transceiver). For example and in one embodiment, process 600 retrieves the monitoring/fault data from the monitoring block of the CPE transceiver (e.g., monitoring function block 106 of OTN and WDM transceiver function blocks 100).

Process 600 instructs a framer block of the transceiver to insert the monitoring/fault data onto overhead bytes of the new frames, depending on the transceiver type, at block 624. In one embodiment, process 600 uses the programming device of the CPE transceiver to instruct the framer block to insert the monitoring/fault data (e.g. monitoring/programming device 116 instructs the framer block 102 to insert the monitoring/fault data into the overhead of the frames as described in FIG. 1 above). By inserting in the monitoring/fault data into the overhead bytes of the new frames, process 600 enables the sending of the monitoring/fault data in-band via the new frames.

At block 626, process 600 inserts the monitoring/fault data into the overhead bytes of the new frames and clocks it to the transmitter block. In one embodiment, process 600 uses the framer block to insert this data into the overhead bytes of the new frames. Furthermore, process 600 uses the framer block to clock the new frames to the transmitter block. By clocking new frames to the transmitter block, process 600 allows the transmitter block of the CPE transceiver to send this data in-band and without needing the transceiver to form special purpose data payloads or communicate over specially configured control channels.

At block 628, process 600 transmits these frames over wavelength. In one embodiment, process 600 transmits these frames over the wavelength is configured on the optical circuits that CPE transceiver is communicating. For example and in one embodiment, the transmitter block transmits the frames on the on optical link to go to the ROADM as illustrated in FIG. 2 above. Process 600 ends at block 630.

In one embodiment, FIGS. 5 and 6 above describe the processes used to receive commands and/or send monitoring/fault data to the ROADM in-band or via external control. FIGS. 7-10 describe processes that can send commands and/or receive monitoring/fault data from a ROADM to the transceiver in the CPE, either in-band or via external control.

FIG. 7 illustrates an exemplary flow diagram of transceiver functions in special module. In one embodiment, the special module is a special line card that is used by the ROADM to transmit command to the CPE and to tap the optical circuit to recover monitoring/fault data from that CPE (e.g., transceiver 308 in special line card 310 as described above in FIG. 3B). Process 700 begins by turning on the transceiver at block 702. Furthermore, at block 704, process 700 determines if the configuration of the local transceiver is locked. If the configuration of the transceiver is locked execution of process 700 moves to block 720 described further below. If the configuration of the transceiver is not locked, process 700 receives a command from external control at block 706. In one embodiment, external control is an out of band control data network that is sent on a different link than the optical link to the transceivers communicate on and is used is by a network-management station (NMS) manage, configure, and/or monitor the CPE transceiver and/or the ROADM transceiver. In one embodiment, process 700 executes commands received from external control at block 704. In one embodiment, process 700 executes the command to configure the transceiver and/or send monitoring data back via external control. Execution of process 700 moves to block 712.

At block 708, process 700 receives an unlocked configuration command from external control. In one embodiment, this command is used to unlock a previously locked configuration of the transceiver in the special module, which subsequently allows the external control such as an NMS, to modify, change, or replace the configuration of the transceiver on the special module. Execution of process 700 moves to block 728 below.

At block 712, process 700 sends get/set or read/write commands in-band to the CPE transceiver that is communicating with the transceiver in the special module. In one embodiment, process 700 sends these get/set or read/write commands to the CPE transceiver as described in FIG. 8 below.

Process 700 determines if the received command is to lock the configuration, at block 714. If the command is to lock the configuration of the transceiver in the special module, execution of process 700 proceeds to block 710, where the configuration of the transceiver is locked. For example and in one embodiment, process 700 locks the local configuration of the transceiver in the special module so that the configuration cannot be further modified without a corresponding unlock configure command from external control. If the command is not to lock the configuration, at block 716, process 700 receives a response if applicable. At block 718 process 700 passes the response to external control. Execution of process 700 proceeds to block 704, where process 700 determines if it has received in-band data.

In one embodiment, process 700 determines if in-band data has been received from the CPE transceiver coupled to the transceiver in the special module. If in-band data has been received, process 700 and determines if this data is a clock sync command at block 722. If this data is a clock sync command at block 722, process 700 syncs the clock of the transceiver in the special module with the clock of the transceiver CPE. Process 700 sends an indication of the synced clock to external control. In one embodiment, process 700 sends this indication to an NMS that is managing the transceiver in the special module.

If the received in-band data is not a clock sync command, process 700 passes this received data to external control at block 724. In one embodiment, the data that is his received in-band by process 700 is monitoring/fault data that is transmitted from the CPE transceiver (either periodically or in response to a command from transceiver function in the special module).

FIG. 8 illustrates an exemplary flow diagram of transceiver behavior in a special module pre-lock. In particular, FIG. 8 illustrates two different functions of the transceiver behavior in special module pre-lock. In blocks 802-812, FIG. 8 illustrates a process, process 800, which sends commands to the CPE transceiver in-band. In one embodiment, an NMS initiates these commands and are sent to the transceiver by external control. These commands are further relayed to the CPE transceiver via the transceiver using as behavior in special module pre-lock to relay commands to the transceiver CPE. In another embodiment, blocks 822-832 illustrates process 800 receiving a response to the previously sent command. In one embodiment, process 800 forwards these responses back to the NMS via external control.

At block 802, process 800 starts for the part of process 800 that sends commands to the transceiver CPE. Process 800 sends get/set or read/write commands to the local transceiver via an external control at block 804. In one embodiment, this local transceiver is the transceiver in the special module and is done during the behavior of the transceiver behavior in the pre-lock mode.

At block 806, process 800 instructs the programming block in the transceiver on in the special module to insert the commands into overhead bytes of the new frames depending on the transceiver type. In one embodiment, the transceiver type is based on the vendor of the transceiver. For example and in one embodiment, a transceiver from one vendor may have a different OTN sets of overhead byes than a transceiver type from another vendor. In one embodiment, process 800 uses the programming device of the CPE transceiver to instruct the framer block to insert the clock sync command (e.g. monitoring/programming device 116 instructs the framer block 102 to insert the get/set or read/write commands into the overhead bytes of the new frames as described as described in FIG. 1 above).

At block 808, process 800 inserts the commands into the overhead bytes of the new frames. Furthermore, process 800 clocks the new frames to the transmitter block at block 808. In one embodiment, process 800 uses the framer block to insert this command into the overhead bytes of the new frames. Furthermore, process 800 uses the framer block to clock the new frames to the transmitter block.

Process 800 transmits new frames to the CPE transceiver over the wavelength at block 810. In one embodiment, process 800 transmits these frames over the wavelength is configured on the optical circuits that transceiver on the special module communicates with the transceiver CPE. Process 800 ends for this part of process at block 812.

As described above process 800 can also act upon responses to the commands transmitted in block 810 and relay those responses to the external control. This part of process 800 is illustrated in blocks 822-832. At block 822, process 800 receives an incoming signal on the special transceiver. In one embodiment, process 800 receives incoming signal using the receiver block 104 as described in FIG. 1 above. Furthermore, in one embodiment, this incoming signal is a response to the get/set or read/write command that was sent from in the CPE transceiver to the transceiver in the special module.

At block 824, process 800 receives the incoming signal and clocks the new frames into the framer block. In one embodiment, the receiver block 102 clocks this signal to the framer block 102 as described above in FIG. 1 above. Process 800 reads the overhead and passes the relevant information to the programming block at block 826. In one embodiment, the framer block 106 passes the relevant information of the new frames to the monitoring function block as described above in FIG. 1 above. In one embodiment, process 800 extracts the overhead bytes and reviews the information in these overhead bytes. If the information is relevant information then process 800 processes the extracted information from the overhead bytes and passes that information on to the program block, such as monitoring function block 106 as described above in FIG. 1. In this embodiment, the framer block has the intelligence to determine what is relevant information and what is not relevant information that is stored in the incoming frame overheads.

At block 828, process 800 buffers the response to get/set or read/write commands into registers. Furthermore, process 800 determines when the entire response is received and sends an indication is that this entire response is received to the special transceiver by external control. Process 800 picks up response by the special module at block 830. In one embodiment, the transceiver in the special module stores this information for later transmission by external control. In another embodiment processed 800 transmits this information to the managing NMS is managing the transceiver in the special module and the transceiver CPE. Process 800 ends at block 832.

FIG. 9 illustrates an exemplary flow diagram of transceiver behavior in a special module post-lock. In FIG. 9, at block 902, process 900 begins by detecting an incoming signal on special transceiver. At block 904, process 900 receives and clocks the frames from the incoming signal into the framer block. In one embodiment, the receiver block 102 clocks this signal to the framer block 102 as described above in FIG. 1 above. At block 906, process 900 reads the overhead bytes of the new frames and passes the relevant information to the programming block. In one embodiment, the framer block 106 passes new frames to the monitoring function block as described above in FIG. 1 above.

At block 908, process 900 determines if relevant information is a clock sync command. If the relevant information is a clock sync command, at block 916, process 900 performs a clock sync with the CPE transceiver and sends an indication of the clock sync to external control. In one embodiment, external control is the out of band control data network that is sent on a different link than the optical link to the transceivers communicate on and is used is by a network-management station (NMS) manage, configure, and/or monitor the CPE transceiver and/or the ROADM transceiver. Execution of process 900 proceeds to block 914, where execution 900 stops.

If the received road information is not a clock sync command, at block 910, process 900 buffers the relevant information the PM/fault data extracted from the incoming signal. In one embodiment, the PM/fault is monitoring/fall data that the CPE transceiver transmits to the transceiver in the special module as described in FIG. 6 above. Furthermore, process 900 determines when the entire response is received and sends an indication that the entire response has been received to the special transceiver by external control. Process 900 picks up response by the special module at block 912. In one embodiment, the transceiver in the special module stores this information for later transmission by external control. In another embodiment, process 900 transmits this information to the managing NMS is managing the transceiver in the special module and the transceiver CPE. Process 900 ends at block 914.

FIG. 10 illustrates an end-to-end lightpath 1008 setup in in-band operation, administration, and management (OAM) according to one embodiment of the invention. In FIG. 10, in one embodiment, a lightpath 1008 is used to communicate data between CPE-A 1006 and CPE-B 1006. In this embodiment, lightpath 1008 is switched over the OTS network 1002 using optical nodes at 1004A-C. Furthermore, each of the optical nodes 1004A-C includes the special module transceivers 1010A-C, respectively. The transceiver in the special module as described above in FIGS. 7-9 above. Each of these transceivers 1010A-C can be used to configure, manage, and monitor the CPE transceivers 1012A-B.

In one embodiment, the CPE can be further managed, configured, and controlled using OTS NMS 1016. In one embodiment, the OTS NMS 1016 can manage, control, and monitor the CPE transceiver 1012A-B through the external control network 1018. Furthermore, in this embodiment, the OTS NMS 1016 can use an open API 1014 to manage, control, and monitor the CPE transceiver 1012A-B through the external control network 1018.

In another embodiment of OTS NMS 1016 can manage, configure, and monitor the CPE transceivers 1012A-B via the optical nodes 1004A-C using lightpath 1018. In this embodiment, the OTS NMS 1016 would send down configuration, monitoring, and/or other management commands to the optical nodes 1004A-C and these optical nodes would relay those commands in-band on the lightpath 1008 to the respective CPE and CPE transceiver. This embodiment is further described in FIGS. 4-9 above.

FIG. 11 illustrates an exemplary flow diagram of measuring CPE-Optical Transport System (OTS) link loss. In FIG. 11, process 1100 begins at block 1102 where process 1100 turns on the laser on the CPE transceiver. In one embodiment, process 1100 turns on the laser on CPE transceiver on using the configuration sent to it from a special module transceiver (e.g., as described in FIG. 5 above). Process 1100 continues by detecting the optical signal from the CPE transceiver laser at block 1110. In one embodiment, process 1100 detects the laser signal using the receiver block 108 as describer in FIG. 1 above.

Process 1100 reads the power level of the detected signal at block 1112. In one embodiment, process 1100 reads the power level signal using the transceiver on special module. At block 1116, process 1100 stores the received power level of the detected signal for later analysis. Execution of process 1100 proceeds to block 1114.

At block 1114, process 1100 sends a command to read a transmission power. In one embodiment, the special transceiver on the ROADM includes this command in the overhead of frames transmitted to the CPE transceiver, so that this command is transmitted in-band.

At block 1104, process 1100 receives the command to read the transmission power. In one embodiment, process 1100 processes this received command as described in FIG. 6 above. Process 1100 reads the transmission power at block 1106. At block 1108, process 1100 sends this response that includes the transmission power level to the transceiver in the special module. In one embodiment, process 1100 sends this response as described in FIG. 6 above.

At block 1118, process 1100 receives and determines the transmitted power reading. In one embodiment, process 1100 determines the transmission power by interrogating the overhead of the new frames received by the transceiver on the special CD and retrieves the transmission that are included into the overhead bytes of the new frames. Process 1100 determines a transmission power loss at block 1120. In one embodiment, process 1100 determines the transmission power loss by determining the difference between the store transmission power from block 1116 minus the received our transmission power that was received to block 1118 and adding a factor that represents the OTS internal loss for transmission.

At block 1122, process 1100 determines if the loss measured in block 1120 is high. In one embodiment, process 1120 determines a high loss by comparing the measured loss against a threshold. If the loss is determined to be high, process 1100 raises an alarm for the high transmission power loss at block 1126. In one embodiment, process 1100 raises an alarm by sending the alarm to the managing NMS by external control. If the loss is not high process 1100 moves to block 1124 where process 1100 stores the measured loss. In one embodiment, process 1100 stores the loss on a database on the ROADM. In another embodiment, process 1100 stores the loss in a database that is managed by the NMS. In this embodiment, process 1100 transmits the loss to the NMS and the NMS stores the transmission power loss.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of managing with an optical node, in-band, a customer premises equipment that is coupled to an optical node via an optical circuit, the method comprising:
   collecting customer premise equipment management information;
   assembling the customer premise management information into the overhead of a first data frame that is to be transmitted on the optical circuit without affecting a payload of that first data frame; and
   transmitting, by the optical node, the first data frame that includes the customer premise equipment management information to the customer premise equipment, wherein the customer premises equipment originates a wavelength used on the optical circuit and the optical node switches this wavelength in the optical circuit.

2. The method of claim 1, wherein the customer premise equipment management information includes optical circuit and optical transport network (OTN) framer configuration information.

3. The method of claim 2, further comprising: configuring the optical circuit with the optical circuit configuration information and the OTN framer configuration information.

4. The method of claim 2, wherein the optical configuration information includes a configure lock command and the customer premise equipment locks a configuration of the customer premise equipment in response to the customer premise equipment receiving the first data frame.

5. The method of claim 2, wherein the optical configuration information includes a configure unlock command and the customer premise equipment unlocks a configuration of the customer premise equipment in response to the customer premise equipment receiving the first data frame.

6. The method of claim 1, further comprising:
receiving a second data frame of the data frames that includes monitoring data in the overhead of the second data frame from the customer premise equipment, wherein the customer premise equipment transmits the second data frame in response to receiving the first data frame and the customer premise equipment management information of this first data frame includes a monitoring command that instructs the customer premise equipment to transmit the monitoring data.

7. An optical node, coupled to a customer premise equipment via an optical circuit, the optical node comprising:
a transceiver to communicate data frames with the customer premise equipment and to manage the customer premise equipment, the transceiver including,
a monitoring function block to collect customer premise equipment management information,
a framer to assemble the customer premise management information into the overhead of a first data frame of the data frames that is to be transmitted on the optical circuit without affecting a payload of that first data frame, and
a transmission block to transmit the first data frame that includes the customer premise equipment management information to the customer premise equipment, wherein the customer premise equipment management information includes optical circuit configuration information and optical transport network (OTN) framer configuration information.

8. The optical node of claim 7, wherein the customer premise equipment to receive the first data frame and configures the optical circuit and OTN framer with the optical circuit the OTN framer configuration information.

9. The optical node of claim 7, wherein the optical configuration information includes a configure lock command and the customer premise equipment to lock a configuration of the customer premise equipment in response to the customer premise equipment receiving the first data frame.

10. The optical node of claim 7, wherein the optical configuration information includes a configure unlock command and the customer premise equipment to unlock a configuration of the customer premise equipment in response to the customer premise equipment receiving the first data frame.

11. The optical node of claim 7, wherein the customer premise equipment is to originate a wavelength used on the optical circuit and the optical node to switch this wavelength in the optical circuit.

12. The optical node of claim 7, wherein the transceiver further comprises:
a receiving block to receive a second data frame that includes monitoring data in the overhead of the second data frame from the customer premise equipment, wherein the customer premise equipment to transmit the second data frame in response to receiving the first data frame and the customer premise equipment management information of this first data frame includes a monitoring command that instructs the customer premise equipment to transmit the monitoring data.

13. An optical network that, manages in-band, a customer premises equipment that is coupled to an optical node via an optical circuit, the optical network comprising:
the customer premises equipment; and
the optical node that communicates data frames with the customer premises equipment, wherein the optical nodes includes,
a transceiver that collects customer premise equipment management information, assembles the customer premise management information into the overhead of one of the data frames that is to be transmitted on the optical circuit without affecting a payload of that data frame, and transmits, to the customer premise equipment, the one of the data frames that includes the customer premise equipment management information, wherein the customer premises equipment originates a wavelength used on the optical circuit and the optical node switches this wavelength in the optical circuit.

14. The optical network of claim 13, wherein the customer premise equipment management information includes optical circuit and optical transport network (OTN) framer configuration information.

15. The optical network of claim 14, wherein the customer premise equipment receives the one of the data frames and configures the optical circuit and OTN framer within the OTN and wavelength division multiplexing (WDM) transceiver appropriately for the end-end optical circuit with the optical circuit the OTM framer configuration information.

16. The optical network of claim 14, wherein the optical configuration information includes a configure lock command and the customer premise equipment locks a configuration of the customer premise equipment in response to the customer premise equipment receiving the first data frame.

17. The optical network of claim 14, wherein the optical configuration information includes a configure unlock command and the customer premise equipment unlocks a configuration of the customer premise equipment in response to the customer premise equipment receiving the first data frame.

* * * * *